(12) United States Patent
Lecomte

(10) Patent No.: US 6,309,112 B1
(45) Date of Patent: Oct. 30, 2001

(54) EASY-TO-CLEAN OPTICAL CONNECTOR SYSTEM

(75) Inventor: Fabrice Lecomte, Saint-Mars d'Outiller (FR)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/496,511

(22) Filed: Feb. 2, 2000

(30) Foreign Application Priority Data

Feb. 3, 1999 (FR) .................................................. 99 01253

(51) Int. Cl.[7] .................................................. G02B 6/38
(52) U.S. Cl. .................................................. 385/59
(58) Field of Search .......................... 385/59, 56, 88–90, 385/147

(56) References Cited

U.S. PATENT DOCUMENTS

| 5,138,679 | * | 8/1992 | Edwards et al. | 385/90 |
| 5,138,680 | * | 8/1992 | Briggs et al. | 385/90 |
| 5,142,597 | * | 8/1992 | Mulholland et al. | 385/56 |
| 5,542,015 | * | 7/1996 | Hultermans | 385/60 |
| 6,146,024 | * | 11/2000 | Melchior | 385/59 |

FOREIGN PATENT DOCUMENTS

0762167 A1   3/1997  (EP) .

* cited by examiner

*Primary Examiner*—Akm E. Ullah
(74) *Attorney, Agent, or Firm*—Perman & Green, LLP

(57) ABSTRACT

In order to make an optical connector (1, 4), particularly the female part (4) thereof, easier to clean, it is provided that, upon disconnection, ferrules (5) embedded in the female cavities (9) of the complementary connector are drawn flush (7) with the complementary connector by sliding the sleeve (6) which forms it. It is shown how, by this arrangement, optical connectors may be cleaned more frequently and easily. The connector is improved by providing a clip (37) which accommodates a pusher at the end of its pushing stroke.

11 Claims, 3 Drawing Sheets

Figure 1:
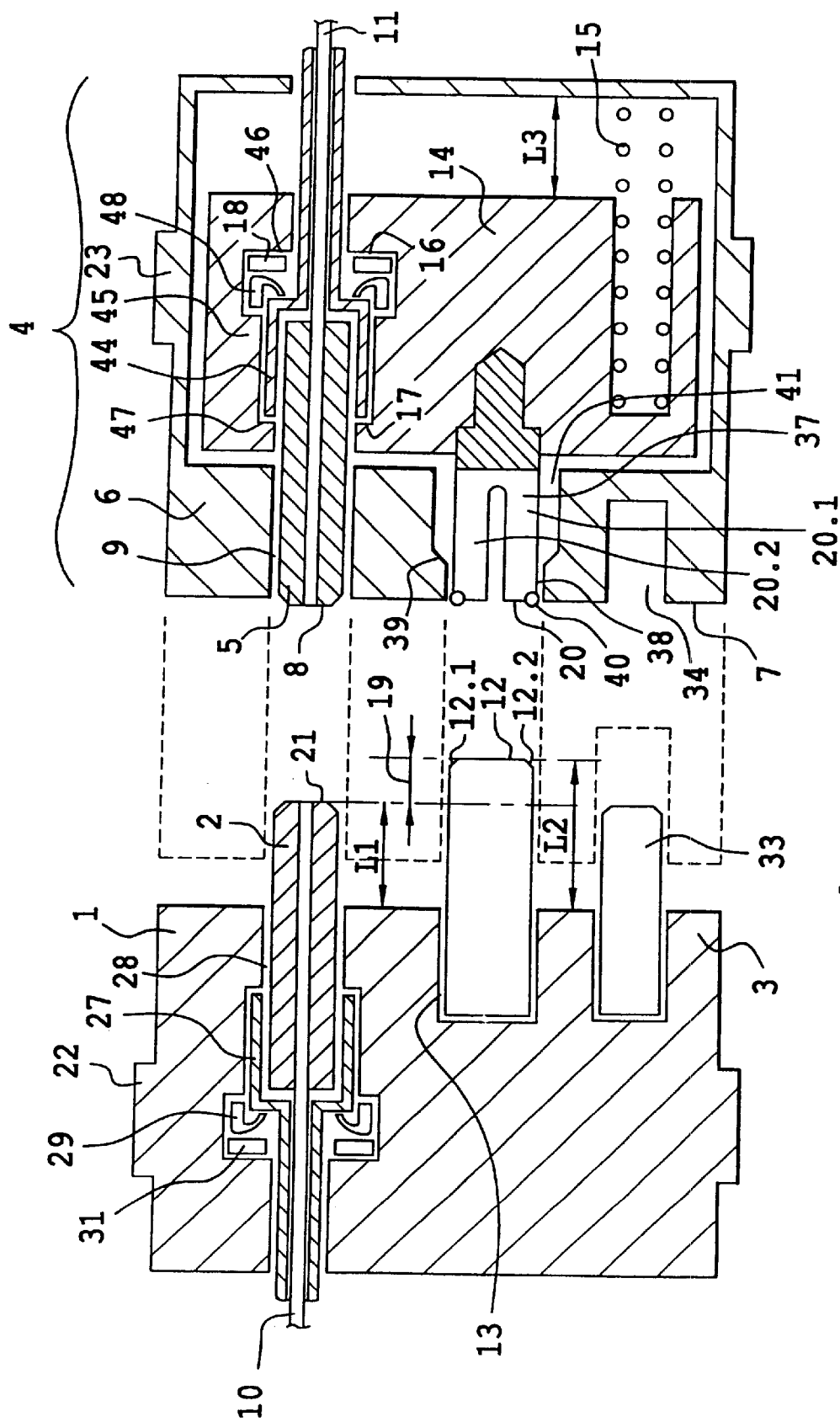

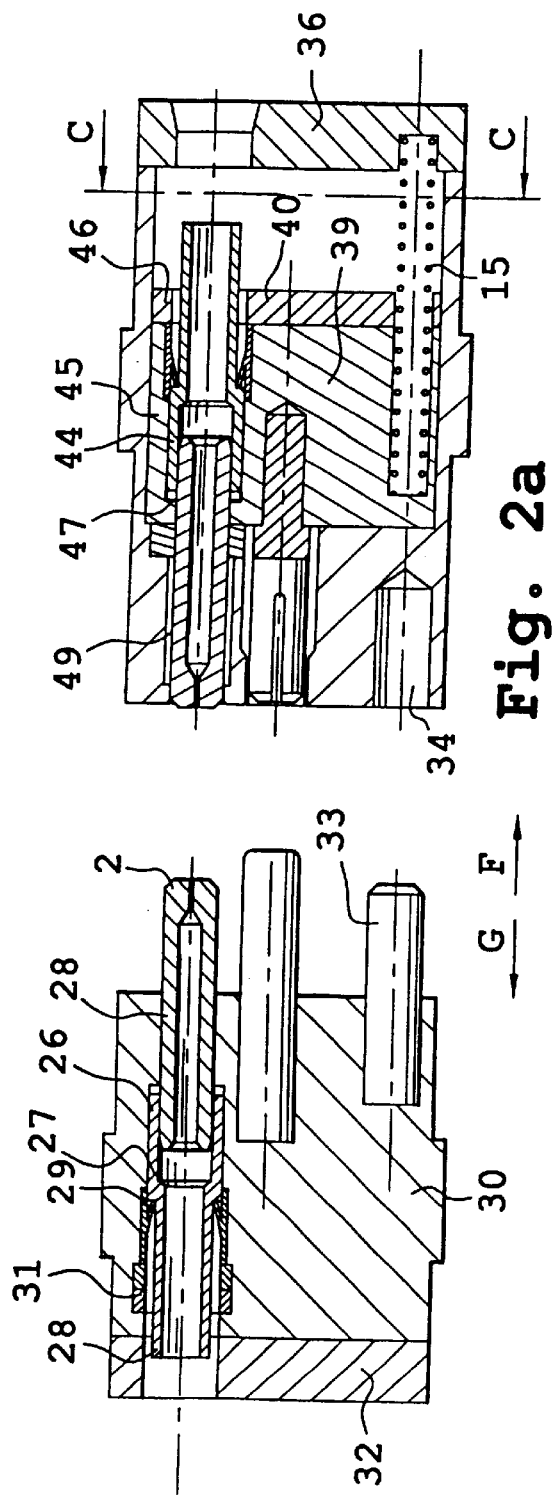
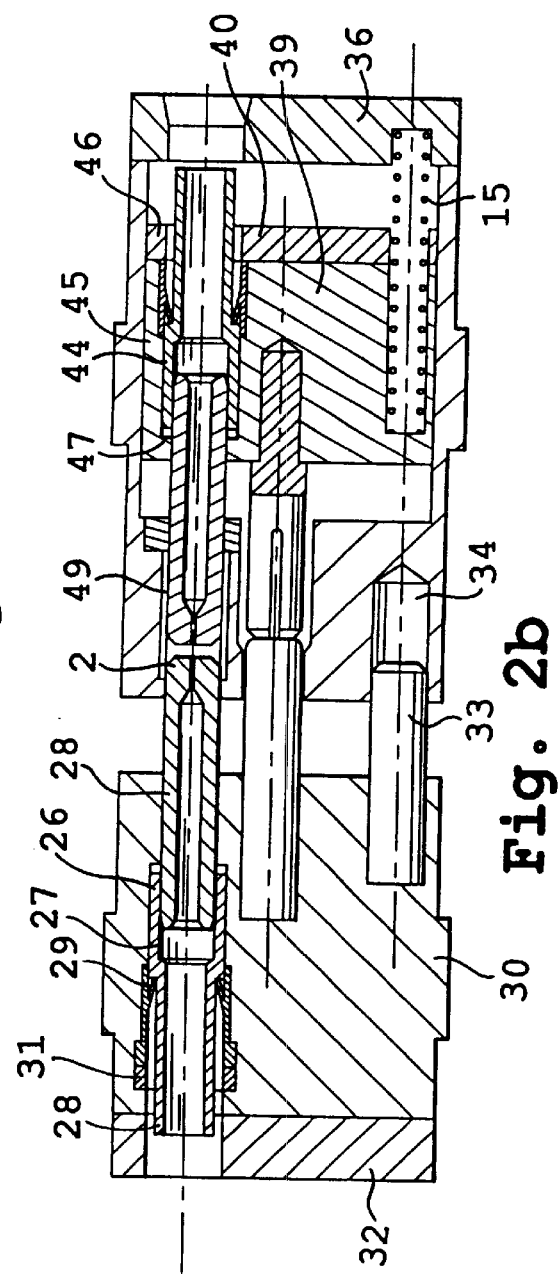

EASY-TO-CLEAN OPTICAL CONNECTOR SYSTEM

The present invention relates to an optical connector system, i.e. a connector system used to connect together sections of optical fibers. The purpose of the invention is to allow such a connector to be easily maintained, particularly cleaned.

Optical fiber connector systems have a principle providing the engagement of a connector, e.g. a male plug, into a complementary connector, e.g. a female socket. Such an engagement has the function to guide and to connect the optical terminations of the connector to the optical terminations of the complementary connector. Protruding ferrules are arranged to this end in the connector. In the complementary connector, a female connector in one example, embedded ferrules are arranged in coincidence therewith. Ferrules are devices designed for maintenance and exposition of one end of an optical fiber section. Ferrules basically have the mechanical function of gripping a fragile end of the optical fiber. In order to obtain a proper alignment of a ferrule with the other, it is desirable for the ferrules to be deeply buried inside the complementary connector. Such good alignment is obtained thanks to an alignment sleeve provided at the circumference of the ferrule of the complementary connector, the two optical ferrules being connected therein. Despite all precautions, it is apparent that, after a certain period of use, such an optical connector is the place where transmission losses occur, due to dirt forming at the ends of the fibers held by these ferrules. Therefore, the latter must be cleaned. Cleaning becomes increasingly critical as the contact depth increases.

In order to solve this problem, the European Patent Application EP-A-0 762 167 recommends the provision of a complementary connector having a raising part. This raising part is the female form of the connector. When it is removed, the complementary connector exposes, flush therewith, the ends of the optical fibers for an easy cleaning thereof. Nevertheless, this solution involves two drawbacks. First, the intermediate raising part has to be removed (and mounted again after cleaning). This involves an additional operation, hence a time loss and requires, due to the miniature size of connectors, the use and possession of special tools. Further, the intermediate raising part to be removed may also be lost. Secondly, when the raising part is removed, it has to be stored in a place which may even not be clean, so that, when it is applied again on the female complementary connector, the resulting cleaning operation is not perfect.

The object of the invention is to obviate this problem by proposing a connector system wherein the different parts of the complementary connector are not separable and wherein the ends of the ferrules of this complementary connector may be accessed by simply disconnecting the connector from the complementary connector.

The principle of the invention consists in providing a complementary connector which may have two states. In a first, disconnected, state, the ferrules of the complementary connector are exposed flush with the complementary connector. Thereby, they are easily accessible for cleaning. Furthermore, it will be shown that, by this arrangement, the internal components of the complementary connector cannot come be contaminated by any dirt which would oppose the cleaning efforts. In a second, connected, state, the complementary connector takes a conventional female shape, corresponding to a mode in which protection is provided against external agents by embedding the connector in this complementary connector.

However, such a device requires springs to cause such a sequence of engagements and contacts between terminations of optical fibers in an automatic manner. In practice, the restoring forces of the different springs have to be differentiated. This requires the more resistant springs to be larger. In the field of miniaturized connectors, in some cases, the size of springs is critical. In the invention, this dimensional problem is solved by removing one of the springs. One of the pushing parts is then replaced by a clip. This clip is stationary when it is subject to a weak stress exerted by a pusher on its head. When the stress becomes stronger, the clip opens and surrounds the end of the pusher, allowing the pusher to keep on progressing. In fact, the clip can only open when the pusher has run a certain stroke and the jaws of the clip are accommodated in a bore allowing them to be spaced apart. Thanks to this arrangement, the connector size can be considerably reduced, and a gain of up to two connector sizes can be obtained as compared with a spring arrangement.

Thus, the invention relates to an optical connector system comprising on the one hand a connector bearing a first set of ferrules and on the other hand a complementary connector having, in coincidence therewith, a second set of ferrules sticking out of a sliding sleeve which is capable of taking two positions, a disconnecting position in which the sleeve is retracted on the complementary connector and exposes the ends of the second ferrules, and a connecting position, in which the sleeve is advanced on the complementary connector and forms the female receptacle for the connector, characterized in that the connector has a fixed pusher and in that the complementary connector has a moving assembly which bears the second set of ferrules and is provided with an adjusting clip abutting on the pusher during the passage from the disconnecting position to the connecting position and which surrounds one end of this pusher in the connecting position.

Figure 2C:
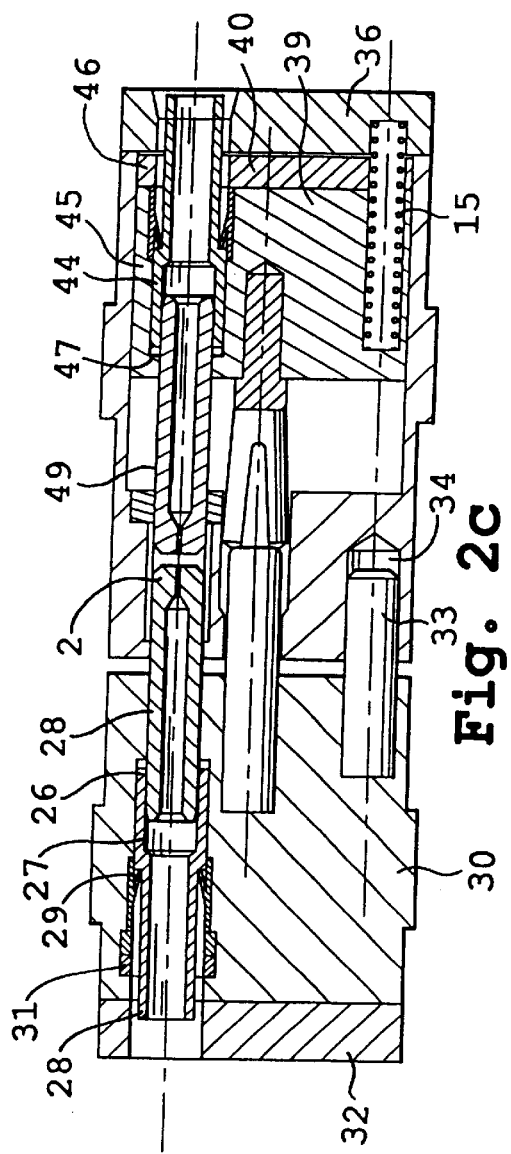
Figure 3A:
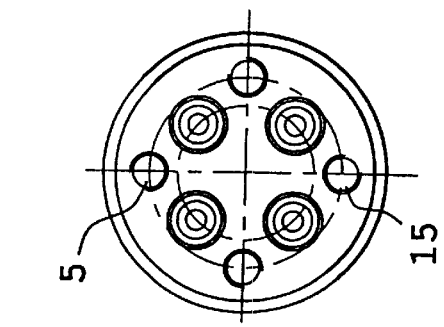
Figure 3B:
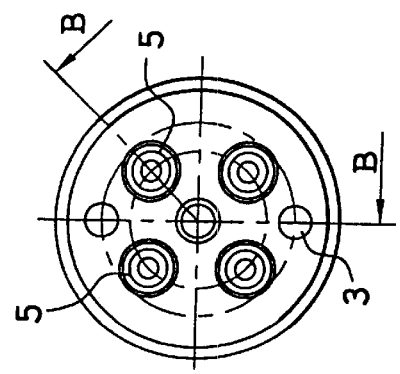
Figure 3C:
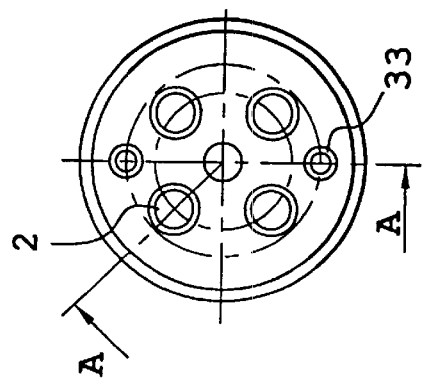

The invention will be understood more clearly by reading the following description and by analyzing the accompanying figures. The latter are only shown by way of example and do not intend to limit the invention in any manner, The figures show:

FIG. 1: a highly simplified schematic view of the optical connector system according to the invention and of the operation thereof;

FIGS. 2a to 2c: detailed views of a preferred embodiment of the optical connector system according to the invention and of the evolution of its different parts during the connection;

FIGS. 3a to 3c: cross sectional views of the connector as shown in FIGS. 2a to 2c.

FIG. 1 shows a simplified schematic view of an optical connector system according to the invention. This comprises on the one hand a connector 1, here a male connector. This connector 1 comprises a first set of ferrules 2. Only one ferrule 2 is shown in the figure, because the connector might have only one of them. Nevertheless, in practice it has more of them, as will be apparent below. The connector is defined male because the ferrule 2 protrudes out of a face 3 of the connector. The optical connector system of the invention comprises, on the other hand, a complementary connector, here a female socket 4. The complementary connector 4 bears a second set of ferrules 5, in coincidence with the ferrules 2. Here again one single ferrule 5 is shown, for simplification. According to a basic characteristic of the invention, the complementary female connector has a body 6 forming a sleeve and capable of taking two positions. The body 6 is shown with section lines in it. It can take two positions with respect to the ferrules 5. In a disconnected position, as shown in FIG. 1, the sleeve is retracted and exposes at its surface 7, flush therewith, the ends 8 of the ferrules 5 of the second set of ferrules. In this position, the ends 8 may be easily cleaned, e.g. by means of dry paper. In another position, as shown in dashed lines, a connecting position, the sleeve 6 is advanced on the complementary connector, the ferrules 5 are retracted and the spaces 9 they occupied in the first position form female receptacles for the ferrules of the complementary connector 4. The ferrules 2 and 5 are in turn connected to optical fibers 10 and 11 respectively.

In order to obtain this result, the ferrules 5 might as well be simply kept in the advanced position with respect to the sleeve 6 by means of a spring. This solution, however, would have caused the repulsion of the ferrules 5 due to the action thereon of the ferrules 2, during the connection. This solution, which may be effective provided that the ends of the ferrules 5 are solid and those of the ferrules 2 are not abrasive, is not preferred, since it would not be equally suitable for frequent connecting and disconnecting operations. Further, the assembly thereof would not be equally accurate and automatic. Therefore, another method is required to connect the ends of the ferrules.

In order to obviate this further problem, the invention provides an improvement consisting of a more complex construction of the connector system. According to this improvement, the connector 1 comprises a massive protruding pusher 12. The pusher 12 is kept protruding out of the surface 3 by embedding its rear part into a bore 13 of the connector 1. The complementary connector 4 comprises a moving assembly 14, in coincidence with the pusher 12. The moving assembly 14 is kept inside the body 6 of the complementary connector 4, towards the face 7, by means of a spring 15. The moving assembly 14 comprises in turn two abutments 16 and 17. These two abutments have the function to keep the ferrule 5 set back therebetween, by means of a spring washer made of an elastomer 18.

This mechanism operates as follows. On the one hand, the pusher 12 has a more pronounced protrusion 19 as compared with the protrusions of the ferules 2 of the connector 1 out of the face 3. In coincidence therewith, the moving assembly 14, in the disconnected position also becomes flush with the surface 7 of the complementary connector 4 by a head 20. What is important here is that, at the beginning of the connecting operation, only the end of the pusher 12 contacts the head 20 of the moving assembly 14. Connection is obtained by driving the sleeve 6 towards the connector 1. Thereby, the moving assembly 14 is driven back into the sleeve 6 and compresses the spring 15. The retraction of the moving assembly into the body 6 causes, thanks to the abutment 17, an equal retraction of the ferrule 5 and of the spring washer 18. In these conditions, the ferrules 2 may be engaged in the progressively cleared cavities 9. During this forward movement, the distance 19 separating the ends of the ferrules is equal to the difference L2–L1, where L1 is the protrusion of the ferrules 2 and L2 the protrusion of the pusher 12.

At a certain point, the moving equipment 14 cannot retract anymore. For the moment, it will be assumed that the spring 15 is at its compression limit, or that a distance L3 separating the rear of the moving assembly 14 from the bottom of the sleeve 6 is smaller than the length L2 of the protrusion of the pusher 12. Later on, it will be shown that the stop of the moving assembly 14 is obtained with precision, in accordance with the necessary movement details. If the connecting operation is continued after this stop, the sleeve 6 being still driven towards the connector 1, the end of the pusher which has a truncated-cone or at least chamfered shape, having chamfers 12.1 and 12.2, penetrates the head 20. To this end, the head 20 consists of the ends of jaws 20.1 and 20.2 of a clip 37. More precisely, the clip 37 is preferably made of a hollow cylinder, partly slit from the head 20. In practice, four slits provide four curved and adjacent blades directed towards the head 20, such as 20.1 and 20.2, which exactly fit the shape of a circular cylindrical bore 38 wherein the clip 37 slides under the thrust of the pusher 12. These curved blades 20.1 and 20.2 are preferably also inwardly bent towards the inside of the cylinder at their ends, thereby forming the head 20.

During the thrust movement, the chamfers 12.1 and 12.2 (in practice one single circular chamfer) of the pusher 12 tend to space the blades apart and to allow the end of the pusher to be driven into the clip 37. However, at least at the beginning, the diameter of the bore 38 is not sufficient to allow this opening of the clip. In these conditions, the clip 37 retracts. At a certain point of the bore 38, the bore has a preferably chamfered recess 39, whereby its diameter increases. This increase would be sufficient to allow the clip blades to be spaced apart. Yet preferably, the stiffness of the blades, due to their curved shape which allows them to slide into the bore 38 and/or to the small length of the slit separating them is sufficient to resist the opening effort transmitted by the chamfers 12.1 and 12.2. In these conditions, even once the recess 39 has been passed, the clip 37 keeps retracting under the thrust of the pusher. When needed, the stiffness of the blades 20.2 and 20.2 might be assisted by the presence of an elastic torus 40 fastened thereto which keeps them close together. Nevertheless, when the assembly abuts on the bottom of the sleeve 6, the pusher can only penetrate the clip 37. If the distance L3 is of the order of L2, then the penetration of the pusher into the clip will be equal to L2–L1, i. e. a short penetration. Due to the clip being opened, the blades 20.1 and 20.2 bulge into a bore 41 formed by the recess 39 of the bore 38. During this penetration, the end 21 of the ferrule 2 runs the length 19, inside the cavity 9, and gets closer to the end 8. To that end, when the moving assembly 14 is stopped, the end 8 is located substantially in the middle of the cavity 9. In other words, the introduction force has first been exerted by the spring 15, then by the blades 20.1 and 20.2, until the end 21 contacts the end 8.

The end 21 of the ferrule 2 is fixed with respect to the face 3 of the connector 1. So, it cannot retract. In these conditions, if the connection movement is further continued, the ferrule 5 retracts into the moving assembly 14, compressing the washer 18. In practice, it is provided that the latter displacement, in which the ferrule 5 is really in mechanical reaction on the ferrule 2 is minimized, e.g. to 0.5 mm. Considering that the engagement has been almost completed, any dirt resulting from this end of coupling will not be critical. It will be also noted that, when the ends 8 are cleaned, the cavities 9 cannot be contaminated: they are protected by the presence of the ferrules 5.

Upon connection, the sleeve 6 is fastened to the connector 1 by means, which are contained inside a box, not shown, and have retractable locks to keep these two parts in this position. These locks grip the raising parts 22 and 23 of the connector and of the complementary connector. Upon disconnection, these locks are released. The washer 18 and the spring 15 interact through a small stroke to drive the sleeve 6 back. Then, for the rest of the stroke, the spring 15 has the basic function to separate the complementary connector 4 from the connector 1. When the head 20, opened by the pusher 12 reaches the recess point 39, the retraction force exerted on the connector 1 extracts the end of the pusher 12 from the clip 37. After this extraction, the clip can be elastically closed. Then, the head 20 can slide again into the bore 38, guided therein by the chamfer of the recess 39. At the end of the disconnection, the spring 15 acts towards driving back the moving equipment 14 which bears the ferrules 5 towards the surface 7 of the complementary connector, to allow cleaning thereof. In these conditions, the ends 8 of the ferrules 5 are exposed to be cleaned, by simply disconnecting the connector from the complementary connector.

FIGS. 2a to 2c show details of a preferred embodiment differing from the simple view of FIG. 1. They have the same reference numerals for the same parts as FIG. 1. From FIG. 2a to FIG. 2c, the connection of the connector to the complementary connector is shown in progression.

The ferrule 2 is supported by a ferrule-carrier 26. The ferrule carrier 26 has a ring 27 at its front part. The ferrule 2 and the ferrule-carrier 26 are crimped on the optical fiber 10 at the factory. The ferrule 2 and the ferrule-carrier 26 are mounted in the connector 1 by inserting the ferrule in a bore 28, formed in the connector 1. The bore 38 has an elastic lock at its head, for instance a blade ring 29 disposed in the bore 28. When the ferrule is inserted, the ring 27 pushes back the blades of the ring 29. When the ferrule has passed over the ends of these blades, the latter slip out and form a lock, preventing any retraction of the ferrule 2 into the connector 1. In order that the ring 29 can be inserted in and fastened to the head of the connector 1, the connector has a plate 30 which has, near the ring 29, a bore having a greater diameter as compared with the bore 28, to accommodate this ring 29. The plate 30 is further fastened to a body 32 of the connector 1 by any means whatever. Particularly, it is screwed. A washer 31 made of an elastomer, whose function is complementary to that of the washer 18, has been placed near the blade ring 29.

FIGS. 3a to 3c are cross sectional views of the connector and complementary connector, at locations AA BB CC and with the directions being indicated. They show that, in a preferred solution, it has been chosen to mount four ferrules 2, regularly arranged around the connector 1. Two diametrically opposite guide pins 33 have been also provided on the connector 1, allowing the connector 1 to be guided into the complementary connector 4. The pins 33 penetrate fitting receptacles 34 formed in the sleeve 6. preferably, the protrusion of the pin/s 33 is intermediate between L1 and L2. FIG. 3c shows that there are four springs 15, intertwined with the ferrules 5 on the periphery of the complementary connector 4, ensuring a proper longitudinal displacement of the moving assembly 14 into the body 6 of the complementary connector 4. The spring 15 is kept abutting by a shoulder 36 fastened to the body 6.

The moving assembly 14 consists of two parts. It has an anvil 39 fastened to a base 40. The ferrule 5 has, like the ferrule 2, a ferrule-carrier 44. The ferrule-carrier 44 is mounted for preparation purposes in a tube with the washer 18. To this end, the tube 45 has two bearings: a rabbet 46 for supporting the washer 18 and an abutment 47 for bearing the ferrule-carrier. The abutment 47 is used both as a bearing to keep the ferrule-carrier inside the tube 45 and as a support for the tube 45 in a bore formed to this end in the body 6 to accommodate the assembly. The rabbet 46 is preferably formed by the presence of the base 40, which makes the assembly easier.

The assembling operation is as follows. The ferrule 5, the ferrule-carrier 44 and the optical fiber 11 are assembled, at the factory, with a second blade ring 48 and the washer 18 inside a tube 45. Then the tube 45 is inserted by its end into the bore 9. The abutment 47 limits the displacement thereof on one side. The second blade ring 48 is of the same type as the ring 29. It allows to lock the ferrule-carrier 44 in position in the tube 45. The base 40 makes the assembling operations easier. In practice, the complementary connector 4 may be first assembled and the ferrule 5 may be introduced therein after this assembling operation. The body 6 has in turn a sleeve 49 in the cavity 9. The sleeve 49 is slit and provides the alignment of the ferrules 2 and 5. This sleeve is mounted in a floating manner in the body 6, to ensure floatability of the optical contacts, thereby assisting the possible realignment of the ferrules 2 and 5.

Besides the considerable size reduction of the connector assembly, consisting of a connector and of a complementary connector (plug and socket), a further important advantage is obtained in using identical male and female contacts, thereby allowing to wire and assemble the system more easily.

What is claimed is:

1. An optical connector system comprising on the one hand a connector (1) bearing a first set of ferrules (2) and on the other hand a complementary connector (4) having, in coincidence therewith, a second set of ferrules (5) sticking out of a sliding sleeve (6) which is capable of taking two positions, a disconnecting position in which the sleeve is retracted on the complementary connector and exposes the ends of the second ferrules, and a connecting position, in which the sleeve is advanced on the complementary connector and forms the female receptacle (9) for the connector, characterized in that the connector has a fixed pusher (12) and in that the complementary connector has a moving assembly (14) which bears the second set of ferrules and is provided with an adjusting clip (37) abutting on the pusher during the passage from the disconnecting position to the connecting position and which surrounds one end of this pusher in the connecting position.

2. A connector system as claimed in claim 1, characterized in that the sleeve of the complementary connector (4) has a bore (38) for accommodating the pusher and the clip, said bore having a recess (39) in its diameter to allow the clip to be opened and to surround the end of the pusher.

3. A connector system as claimed in claim 1, characterized in that the clip comprises a section of a circular cylinder consisting of straightened curved blades (20.2, 20.2).

4. A connector system as claimed in claim 3, characterized in that the straightened blades are curved towards the inside of the cylinder and in that the end of the pusher has a truncated-cone shape (12.1, 12.2).

5. A connector system as claimed claim 1, characterized in that a clip head comprises an elastic torus (40) keeping the blades close together and in that the end of the pusher has a truncated cone shape.

6. A connector system as claimed in claim 1, characterized in that the ferrules are kept inside the connector or inside the female complementary connector by means of an elastic lock (29, 48) and of a washer made of an elastomer (31, 18).

7. A connector system as claimed in claim 1, characterized in that the connector has a set of guide pins (33) and in that the female complementary connector has a set of receptacles (34) which can accommodate each one pin of the set of guide pins.

8. A connector system as claimed in claim 1, characterized in that the clip is mounted in a bore formed in the moving assembly.

9. A connector system as claimed in claim 1, characterized in that the connector and the complementary connector have raising parts (22, 23) for keeping them in position, connected in a box.

10. A connector system as claimed in claim 1, characterized in that the sleeve comprises a slit realignment sleeve (49).

11. A connector system as claimed in claim 1, characterized in that the ferrules of the connector are identical to the ferrules of the complementary connector.

* * * * *

UNITED STATES PATENT AND TRADEMARK OFFICE
CERTIFICATE OF CORRECTION

PATENT NO. : 6,309,112 B1  
DATED : October 30, 2001  
INVENTOR(S) : Lecomte

Page 1 of 1

It is certified that error appears in the above-identified patent and that said Letters Patent is hereby corrected as shown below:

Column 6,
Line 51, delete "claim 1" and insert -- claim 3 --.

Signed and Sealed this

Thirtieth Day of April, 2002

Attest:

JAMES E. ROGAN
*Director of the United States Patent and Trademark Office*

*Attesting Officer*